(12) United States Patent
Shimanaka et al.

(10) Patent No.: US 8,895,646 B2
(45) Date of Patent: Nov. 25, 2014

(54) PIGMENT DISPERSION AND METHOD FOR PRODUCING RESIN-TREATED PIGMENT IN THE PIGMENT DISPERSION

(75) Inventors: Hiroyuki Shimanaka, Tokyo (JP); Yoshikazu Murakami, Tokyo (JP); Shinichiro Aoyagi, Tokyo (JP); Atsushi Goto, Kyoto (JP); Yoshinobu Tsujii, Kyoto (JP)

(73) Assignees: Dainichiseika Color & Chemicals Mfg. Co., Ltd., Tokyo (JP); Kyoto University, Kyoto (JP)

( * ) Notice: Subject to any disclaimer, the term of this patent is extended or adjusted under 35 U.S.C. 154(b) by 72 days.

(21) Appl. No.: 13/636,924

(22) PCT Filed: Mar. 22, 2011

(86) PCT No.: PCT/JP2011/056742
§ 371 (c)(1),
(2), (4) Date: Sep. 24, 2012

(87) PCT Pub. No.: WO2011/118557
PCT Pub. Date: Sep. 29, 2011

(65) Prior Publication Data
US 2013/0012626 A1    Jan. 10, 2013

(30) Foreign Application Priority Data
Mar. 24, 2010 (JP) ................ 2010-068871

(51) Int. Cl.
*C08L 53/00* (2006.01)
*C08K 5/08* (2006.01)
*C08K 5/23* (2006.01)

(52) U.S. Cl.
USPC ............... 524/88; 524/92; 524/190; 524/358

(58) Field of Classification Search
USPC ....................... 524/88, 92, 190, 358
See application file for complete search history.

(56) References Cited

FOREIGN PATENT DOCUMENTS

| | | |
|---|---|---|
| CN | 1802409 | 7/2006 |
| EP | 1006161 | 6/2000 |
| EP | 1067144 | 1/2001 |
| JP | 7-142173 | 6/1995 |
| JP | 8-208976 | 8/1996 |
| JP | 10-279859 | 10/1998 |
| JP | 2000-005695 | 1/2000 |
| JP | 2000-109739 | 4/2000 |
| JP | 2002-265828 | 9/2002 |
| JP | 2003-253148 | 9/2003 |
| JP | 2004-026930 | 1/2004 |
| JP | 2005-054183 | 3/2005 |
| JP | 2005-171028 | 6/2005 |
| TW | 200731006 | 8/2007 |
| WO | WO 2004/090030 | 10/2004 |
| WO | WO 2004/090030 A1 * 10/2004 | ............... C08K 3/00 |
| WO | WO2010/013651 | 2/2010 |

* cited by examiner

*Primary Examiner* — Robert D. Harlan
(74) *Attorney, Agent, or Firm* — Hamre, Schumann, Mueller & Larson, P.C.

(57) ABSTRACT

Disclosed are a resin-treated pigment characterized in that the resin-treated pigment comprises a pigment and a polymer of an unsaturated bond-containing monomer, a weight ratio of the pigment to the polymer (pigment:polymer) is from 50 to 95 to from 5 to 50, and the polymer is a block copolymer comprising from 5 to 70 mass % of an addition-polymerizable monomer having a UV-absorbing group; a production process of the resin-treated pigment; and a pigment dispersion using the resin-treated pigment.

10 Claims, No Drawings

PIGMENT DISPERSION AND METHOD FOR PRODUCING RESIN-TREATED PIGMENT IN THE PIGMENT DISPERSION

TECHNICAL FIELD

This invention relates to a resin-treated pigment with improved light resistance, a production process of the pigment, and a pigment dispersion containing the pigment dispersed therein. More specifically, the present invention is concerned with a resin-treated pigment comprising a pigment treated and encapsulated with a copolymer (block copolymer), which comprises as constituent monomer units thereof at least an addition-polymerizable monomer having a UV-absorbing group, more preferably an acrylic A-B block copolymer, a production process of the pigment, and a dispersion of the pigment.

BACKGROUND ART

Unlike a dye, a pigment does not exist in the form of molecules in a medium, but exists as crystal particles in the medium. When the pigment is employed as a colorant in various products, these products are more resistant to degradation and discoloration under light and UV light, in other words, show better light resistance than those making use of the dye as a colorant. Making good use of this property, pigments have found utility as colorants suited for an extremely wide variety of applications such as indoor and outdoor paints, inks, coating formulations, textile printing agents, stationery, color filters, toners, inkjet inks, moldings and otherwise formed products, films, fiber coloring, and so on.

Nonetheless, even such pigments include those inferior in light resistance as will be mentioned below. Pigments include inorganic pigments formed of inorganic compounds and organic pigments formed of organic pigments. In general, inorganic pigments tend to have better light resistance compared with organic pigments, but even such inorganic pigments include those inferior in light resistance. Taking titanium oxide as a pigment, for example, the anatase type and rutile type are known depending on a difference in crystal form. The anatase type is generally inferior in light resistance. Even when organic pigments have crystallized and exist as particles, deterioration unavoidably occurs under UV light as they are organic compounds. As described above, the organic pigments, therefore, tend to be inferior in light resistance compared with inorganic pigments. Among organic pigments, azo pigments are low in light resistance because the azo groups in their structures are prone to degradation under UV light. Even among copper phthalocyanine pigments having high light resistance, $\epsilon$-copper phthalocyanines are known to be lower in light resistance than those of other crystalline forms.

Even when a pigment exists as crystals, that is, as particles, it may have inferior light resistance depending on its particle size. For example, the light resistance of a pigment tends to become inferior as it is microparticulated. Upon application of a pigment to an inkjet ink, for example, further ultrafine grinding is required from the specialty of the recording method that the ink is ejected from a narrow nozzle. Especially with a yellow azo pigment, its microparticulation results in inferior light resistance or leads to a reduction in the available color range. It is, therefore, the current circumstance that the particle size of a pigment to be used is determined with a compromise. In the case of a pigment for a color filter, on the other hand, it is essential to microparticulate the pigment to increase its contrast and transparency. Here again, there is the problem that its light resistance is lowered because its particle size is made smaller. With a view to overcoming this problem, a measure has been taken such that a protective layer such as an UV-absorbing film is introduced to protect an ultrafinely ground pigment from UV light as much as possible. As described above, however, the light resistance of a pigment depends on its molecular structure, crystalline structure and particle size, and therefore, is determined by its physical properties. Therefore, a limitation may be imposed on the use of the pigment from the standpoint of light resistance. Depending on the application, a desired pigment may not be used.

For providing a pigment with improved light resistance, it is a current practice to change the structure of the pigment or to increase the molecular weight of the pigment, or in the case of an azo pigment, to form a diazo or higher azo pigment having two or more azo groups so that the molecular weight is increased. It has also been proposed to control the particle size or crystalline form of the pigment, or especially to provide the pigment with high crystallizability (see, for example, Patent Document 1).

It has also been proposed to add a light resistance improving additive such as an ultraviolet absorber or light stabilizer when a pigment is added as a colorant upon manufacture of a product (see, for example, Patent Document 2). In addition, it has also been proposed to reduce discoloration of a pigment in a product, in which the pigment has been added, by forming the product into a multilayer structure or overcoated structure with a film, coating formulation or the like in which an ultraviolet absorber has been added, or by applying an UV-absorbing film or coating to a light source to prevent the emission of UV light or to cut out UV light (see, for example, Patent Document 3).

PRIOR ART DOCUMENTS

Patent Documents

Patent Document 1: JP-A-2004-26930
Patent Document 2: JP-A-8-208976
Patent Document 3: JP-A-7-142173

DISCLOSURE OF THE INVENTION

Problem to be Solved by the Invention

With the above-described conventional method, however, a hue may be altered or a desired hue may not be obtained due to a change in structure or an increase in molecular weight. When a particle size is enlarged, a color can be retained, and as a consequence, improved light resistance can be provided, because, even if a surface is degraded, an inner layer under a surface layer develops the color. This method, however, results in deteriorations of the brilliance, transparency and color developing properties of the pigment.

Further, the conventional method that adds an additive such as an ultraviolet absorber along with a pigment to an article to provide the article with improved light resistance involves a problem in the sustainability of its effect, because the additive has a low molecular weight and bleeds out or is extracted when used in the article. For this method, it is necessary to keep the ultraviolet absorber or the like in the vicinity of the pigment to protect the pigment from UV light or to trap radicals and the like, which are formed through degradation, to provide the pigment with improved light resistance. Due to the low molecular weight, however, the ultraviolet absorber is considered to diffuse and to hardly stay in the vicinity of the pigment so that its effect is not sufficient. Furthermore, the above-described method that cuts out UV light from a light source by a UV-absorbing film or the like is not a means that can provide a fundamental solution for the improvement of the light resistance of a pigment.

In the meantime, the present inventors came to an idea that a method that treats a pigment with a polymer having UV-absorbing groups would be effective. As the polymer in this method is not low in molecular weight unlike ultraviolet absorbers, the polymer does not bleed out or is not extracted. If the polymer is designed to have no miscibility with a dispersion medium, effects can be expected from the coating of the pigment with the polymer.

However, a monomer having a UV-absorbing group is generally low in solvent solubility, and therefore, may not be introduced at a high concentration in a polymer. By selecting a solvent to cope with this problem, it is possible to obtain a UV-absorbing polymer in which a UV-absorbing monomer has been introduced at a high concentration. However, this approach needs to select an optimal solvent, and there fore, is irksome. Moreover, the above-described UV-absorbing polymer has low compatibility with a dispersion medium, and tends to provide a pigment with low dispersibility when used in the resin treatment of the pigment. Furthermore, the UV-absorbing monomer involves an economical problem in that it is generally costly and its introduction at a high concentration pushes up the cost of the resulting product.

Therefore, objects of the present invention are to provide a resin-treated pigment making use of a polymer, which contains as constituent monomer units at least an addition-polymerizable monomer having a UV-absorbing group, and having improved light resistance, a production process of the pigment, and a pigment dispersion with the pigment dispersed therein. A further object of the present invention is to provide a pigment with improved light resistance, thereby making it possible to use the pigment in applications and fields where the pigment has heretofore not been usable and in addition, to employ a pigment the use of which has heretofore not been feasible due to its insufficient light resistance, and hence, to expand the color expression range of the pigment. A still further object of the present invention is to provide a pigment with further improved light resistance even in fields where the pigment has been used to date, whereby on products to which the pigment has been applied as a colorant, prolongation of degradation time can be achieved to allow the products to last longer and to permit providing, for a variety of applications, various products of improved light resistance that can also contribute to resource saving.

Means for Solving the Problem

The above-described objects can be achieved by the present invention to be described below. Specifically, the present invention provides a resin-treated pigment characterized in that the resin-treated pigment comprises a pigment and a polymer of an unsaturated bond-containing monomer, a weight ratio of the pigment to the polymer (pigment:polymer) is from 50 to 95 to from 5 to 50, and the polymer is a block copolymer comprising from 5 to 70 mass % of an addition-polymerizable monomer having a UV-absorbing group.

As described above, the pigment can be provided with improved light resistance by coating particles of the pigment with the block copolymer having the UV-absorbing groups to achieve so-called encapsulation of the particles. The term "encapsulation" as used herein means that the block copolymer is adsorbed or deposited on the surfaces of pigment particles, and further that the block copolymer is formed into films to coat the surfaces of the pigment particles.

As a preferred embodiment of the present invention, the block copolymer is an A-B block copolymer as an acrylic polymer, a polymer block of A chain that constitutes the A-B block copolymer is an acrylic polymer miscible with a dispersion medium, and a polymer block of B chain that also constitutes the A-B block copolymer is an acrylic polymer comprising, as constituent monomer units thereof, 70% or more of a total mass of the addition-polymerizable monomer having the UV-absorbing group and contained in the block copolymer.

According to the above-described preferred embodiment, the use of the A-B block copolymer having the above-described construction makes it possible to efficiently coat and encapsulate the pigment particles with the polymer block of B chain, on which UV-absorbing groups concentrate, and to absorb UV light, and as a consequence, the pigment can be provided with enhanced light resistance. Although the UV-absorbing monomer is relatively costly, the A-B block copolymer can decrease the amount of the UV-absorbing monomer to be used, and therefore, is helpful in reducing a cost rise. Moreover, the polymer block of A chain is compatible with the dispersion medium owing to the above-described construction so that the resin-treated pigment is provided with still improved dispersibility.

As more preferred embodiments of the resin-treated pigment according to the present invention, the following features can be mentioned. The polymer block of A chain has a number average molecular weight (Mn) of from 1,000 to 20,000, and as a molecular weight distribution, a weight average molecular weight/number average molecular weight (Mw/Mn) of 1.6 or smaller, and the polymer block of B chain has a molecular weight of lower than 10,000; and further, the polymer block of A chain comprises a carboxyl-containing acrylic monomer as constituent monomer units thereof, and has an acid value of from 50 to 250 mgKOH/g. The control of the acid value as described above makes it possible to use the resin-treated pigment in aqueous compositions.

In addition, the A-B block copolymer comprises methacrylate monomers as all constituent monomer units thereof; and further, the UV-absorbing group is a UV-absorbing benzotriazole group, UV-absorbing triazine group or UV-absorbing benzophenone group.

As another embodiment, the present invention also provides a production process for obtaining the above-described resin-treated pigment, characterized in that the production process comprises synthesizing the A-B block copolymer by a living radical polymerization process which uses at least an organic iodine compound as an initiator compound, and treating the pigment with the resulting A-B block copolymer. The term "treating" as used herein may mean to conduct pigmentation or ultrafine grinding, dispersion, mixing and the like in the presence of the A-B block copolymer such that the A-B block copolymer is allowed to deposit on the surfaces of pigment particles to encapsulate the pigment.

As a preferred embodiment of the production process according to the present invention, the synthesis by the living radical polymerization process uses, as a catalyst, at least one compound selected from the group consisting of phosphorus halides, phosphite compounds, phosphinate compounds, imide compounds, hydantoin compounds, barbituric acids, cyanuric acids, phenolic compounds, iodoxyphenyl compounds, vitamins, diphenylmethane compounds, cyclopentadienes, and acetoacetyl compounds.

As a further embodiment of the present invention, the present invention also provides a pigment dispersion comprising a dispersion medium, which comprises at least one medium selected from the group consisting of water, monomers, organic solvents, thermoplastic resins, thermosetting resins and UV/ER-curable resins, and a pigment dispersed in the dispersion medium, characterized in that the pigment is any one of the resin-treated pigments described above. The resin-treated pigment and pigment dispersion according to the present invention can be widely used as colorants, for example, for paints, inks, coating formulations, stationery, textile printing agents, color filters, toners, inkjet inks, and plastics.

Advantageous Effects of the Invention

According to the present invention, there are provided a resin-treated pigment with improved light resistance which comprises as constituent monomer units at least an addition-polymerizable monomer having a UV-absorbing group, a production process of the pigment and a pigment dispersion containing the pigment. According to the present invention, the provision of the improved light resistance to the pigment makes it possible to use the pigment in applications and fields where the pigment has heretofore not been usable and in addition, to employ a pigment the use of which has heretofore not been feasible due to its insufficient light resistance, and therefore, to expand the color expression range of the pigment. According to the present invention, the provision of further improved light resistance to a pigment even in fields where the pigment has been used to date can achieve prolongation of degradation time on products to which the pigment has been applied as a colorant, thereby allowing the products to last longer and to also permit providing, for a variety of conventional applications, various products of improved light resistance that can also contribute to resource saving.

MODES FOR CARRYING OUT THE INVENTION

The present invention will hereinafter be described in further detail based on preferred embodiments for carrying out the present invention.

The resin-treated pigment according to the present invention comprises a pigment and a polymer of an unsaturated bond-containing monomer, the weight ratio of the pigment to the polymer (pigment:polymer) is from 50 to 95 to from 5 to 50, and the polymer is a block copolymer comprising from 5 to 70 mass % of an addition-polymerizable monomer having a UV-absorbing group. The present invention, therefore, uses a block copolymer in which a UV-absorbing monomer accounts for from 5 to 70 mass % of monomer components used in the whole block copolymer. It is more preferred to use an A-B block copolymer in which 70% or more of the whole mass of the used UV-absorbing monomer concentrate on one of the polymer blocks.

As described above, an A-B block copolymer having a polymer block of a structure that 70% or more of UV-absorbing groups concentrate is used as a block copolymer having UV-absorbing groups in the more preferred embodiment of the present invention. The UV-absorbing groups concentrate, for example, on the polymer block of B chain, and more preferably, the UV-absorbing groups have been derived from an aromatic ring compound of any one of the benzotriazole, triazine and benzophenone types. When such an A-B block copolymer is used along with a pigment, the polymer is not compatible with a dispersion medium, and as a consequence, can encapsulate the pigment, and moreover, UV-absorbing groups contained in the whole polymer can be concentrated on the polymer block of B chain, because the polymer is high in the miscibility with the pigment and is relatively large in molecular weight. The use of such a polymer makes it possible to absorb more UV light at the surface of the pigment, and hence, to provide the pigment with further improved light resistance. Making a comparison between polymer molecule chains having the same UV absorption rate, UV-absorbing groups are distributed at random on the molecule chain in conventional random polymerization but are concentrated on the polymer block of B chain in the case of the block copolymer. Presumably for the above-described reason, the present inventors have confirmed that, even when UV-absorbing groups are introduced at the same concentration in polymers, the formation of a block copolymer can provide a pigment with better light resistance. Described specifically, because a block copolymer is selected as a resin to be used along with a pigment in the present invention, the present invention has made it possible to exhibit higher performance for the improvement of light resistance at a lower concentration of introduced UV-absorbing groups than the use of a usual random copolymer.

When the A-B block copolymer is selected as a polymer for use in the present invention, it is possible to obtain, owing to its structural characteristics, such advantageous effects as will be mentioned below. Described specifically, the polymer block of B chain coats and encapsulates a pigment while the polymer block of A chain is miscible with a dispersion medium. When the pigment treated with the A-B block copolymer is dispersed in the dispersion medium, the A chain diffuses in the dispersion medium to provide the pigment with good dispersibility. The dispersion of the resin-treated pigment of such a construction in the dispersion medium can provide an excellent colorant that can materialize high light resistance, high transparency, high color development, high dispersion stability, microdispersibility and high heat resistance. A description will hereinafter be made about the individual components that make up the resin-treated pigment according to the present invention.

As pigments for use in the present invention, conventionally-known inorganic pigments and organic pigments are both usable, and no particular limitation is thus imposed on the pigments for use in the present invention. According to the present invention, when a pigment of insufficient light resistance is used, the pigment can be provided with improved light resistance and, even when a pigment of excellent light resistance is used, the pigment can be provided with further improved light resistance.

Specifically, the organic pigments include, for example, soluble azo pigments, insoluble azo pigments, phthalocyanine pigments, quinacridone pigments, isoindolinone pigments, isoindoline pigments, perylene pigments, perinone pigments, dioxazine pigments, anthraquinone pigments, dianthraquinonyl pigments, anthrapyrimidine pigments, anthanthrone pigments, indanthrone pigments, flavanthrone pigments, pyranthrone pigments, diketopyrrolopyrrole pigments, and the like. Needless to say, the present invention shall not be limited to these organic pigments.

The inorganic pigments include, for example, white pigments such as rutile-type titanium oxide, anatase-type titanium oxide, brookite-type titanium oxide, and microparticulate titanium oxide, and if necessary, photocatalyst titanium oxide, zinc oxide, and zinc sulfide; clays such as barium sulfate, calcium carbonate, calcium sulfate, kaolin and white clay; silicon dioxides such as silica and diatomaceous earth; extender pigments such as talc, magnesium sulfate and alumina; inorganic color pigments and composite oxide pigments, such as ocher, titanium yellow, red iron oxide, ultramarine, Prussian blue, cobalt blue, cerulean blue, zinc green, emerald green, cobalt green, nickel/cobalt/zinc/titanium composite oxides, cobalt/chromium composite oxides, and copper/chromium/manganese composite oxides; fluorescent pigments such as strontium sulfide, zinc sulfide and tungsten calcium; glow pigments such as strontium aluminate; pearlescent pigments, that is, titanium-treated products of micas such as mica, muscovite, annite and phlogopite; and in addition, glass powder, silicon carbide, silicon nitride, ferrite, and the like. Zinc oxide which absorbs UV light is particularly preferred as its ability to absorb UV light can be enhanced when treated with the A-B block copolymer.

A description will next be made about the polymer, which has UV-absorbing groups and is used in the present invention to treat such a pigment as mentioned above. The polymer for use in the present invention is characterized in that it is a block copolymer obtained by polymerizing an addition-polymerizable monomer having a UV-absorbing group. There are polymers of other structures such as random copolymers and graft copolymers, and these polymers may be used in combination. For the reasons mentioned above, however, the present invention is characterized especially by the use of the block copolymer.

As the block copolymer for use in the present invention, one having the below-described construction is particularly preferred. Described specifically, preferred is an A-B block copolymer, which comprises as constituent monomer units thereof an addition-polymerizable monomer having a UV-absorbing group and has a construction that the polymer block of A chain is an acrylic polymer miscible with a dispersion medium and the polymer block of B chain comprises, as constituent monomer units thereof, 70% or more of the addition-polymerizable monomer having the UV-absorbing group and contained in the whole block copolymer.

When a pigment is treated by such an A-B block copolymer, the polymer block of B chain deposits and coats the pigment and encapsulates the pigment, and on the other hand, the polymer block of A chain is miscible and hence compatible with a dispersion medium.

As the addition-polymerizable monomer which has the UV-absorbing group and is usable in the present invention, one known to date can be used. In the present invention, it is particularly preferred to use an addition-polymerizable monomer having a UV-absorbing benzotriazole group, UV-absorbing triazine group or UV-absorbing benzophenone group. Compounds having these UV-absorbing groups have been conventionally used as ultraviolet absorbers, and can fully exhibit their performance when such UV-absorbing groups are contained as residua in the block copolymer. As will be described subsequently herein, the above-described UV-absorbing groups suitable for the present invention are each a molecule with many aromatic rings contained in its skeleton, is provided with adsorptive property to the pigment based on π-π stacking, and is inferior in solvent solubility due to the existence of the many aromatic rings, and therefore, is helpful in allowing the block copolymer to deposit on the pigment for its coating and encapsulation.

As examples of UV-absorbing groups suitable for the present invention, functional groups having such skeletons as will be described hereinafter can be mentioned, each of which can be formed into a monovalent residuum by removing a hydrogen atom from the below-described structure thereof. The addition-polymerizable monomer, which has a UV-absorbing group and is suitable for the present invention, has an addition-polymerizable group bonded to an appropriate position of its skeleton directly or via one of various functional groups (for example, an ester, amide or like bond).

First, the skeleton of a UV-absorbing benzotriazole group can be generally represented by the below-described structural formula. For example, by using as a monomer one having an addition-polymerizable group bonded to the position R' in the structural formula, it is possible to obtain a polymer block of B chain in the structure of which UV-absorbing benzotriazole groups are bonded.

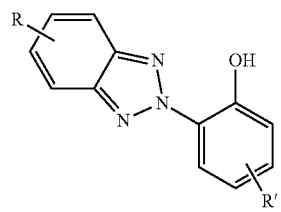

In the above-described formula, R and R' may be the same or different, and are each selected from the group consisting of a hydrogen atom, halogen atoms, alkyl groups, alkenyl groups, an allyl group, alkoxy groups, ester groups and an oxycarbonyl group.

A UV-absorbing triazine group generally has a structure having the following skeleton.

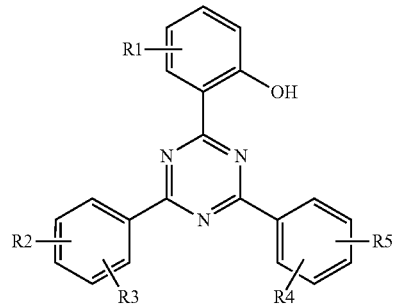

In the formula, R1 to R5 may be the same or different, and are each selected from the group consisting of a hydrogen atom, halogen atoms, alkyl groups, alkenyl groups, an allyl group, alkoxy groups, ester groups and an oxycarbonyl group.

A UV-absorbing benzophenone group generally has a structure having the following skeleton.

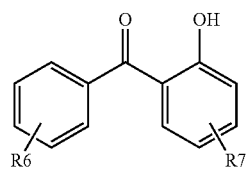

In the formula, R6 and R7 may be the same or different, and are each selected from the group consisting of a hydrogen atom, halogen atoms, alkyl groups, alkenyl groups, alkoxy groups, an allyl group, ester groups and an oxycarbonyl group. As the UV-absorbing group for use in the present invention, it is preferred to use one containing one of the structural moieties shown above.

As a monomer having such a UV-absorbing group, a conventionally-known monomer can be used. A monomer of any structure can be used insofar as it is an addition-polymerizable monomer having a UV-absorbing group of such a structure as described above.

As such an addition-polymerizable monomer with a UV-absorbing group contained therein, a commercial product may be used, as it is, for polymerization. As an alternative, a monomer having a reactive group such as, for example, a glycidyl group or isocyanate group and an ultraviolet absorber having a functional group reactive to the reactive group are reacted to obtain a monomer, and this monomer may be used. As a further alternative, subsequent to the polymerization of the monomer having the reactive group, the ultraviolet absorber having the functional group reactive to the reactive group is reacted to obtain a block copolymer which has UV-absorbing ability and is usable in the present invention.

As addition-polymerizable monomers having a UV-absorbing group, those to be described hereinafter can be mentioned. Examples of monomers having a UV-absorbing benzotriazole group include those obtained by reacting 2-(2'-hydroxy-3'-vinylphenyl)-2H-benzotriazole, 2-(2'-hydroxy-5'-(meth)acryloxyethylphenyl)-2H-benzotriazole or 2-(2,4-dihydroxyphenyl)-2H-benzotriazole with glycidyl(meth) acrylate or the like. Examples of monomers having a UV-absorbing triazine group include one obtained by reacting 2-(2,4-dihydroxyphenyl)-4,6-bis(2,4-dimethylphenyl)-1, 3,5-triazine with glycidyl methacrylate, and one obtained by reacting 2-[4-[(2-hydroxy-3-dodecylpropyl)oxy]-2-hydroxyphenyl]-4,6-bis(2,4-dimethylphenyl)-1,3,5-triazine or the like with (meth)acryloxyethyl isocyanate or the like. Examples of monomers having a UV-absorbing benzophenone group include (meth)acryloxyethylbenzophenone and the like. However, the present invention shall not be limited to the use of these exemplified monomers.

The block copolymer for use in the present invention is a polymer that contains such an addition-polymerizable monomer having a UV-absorbing group as described above in a proportion of preferably from 5 to 70%, more preferably from 5 to 50%, still more preferably from 10 to 30% on a mass basis. A proportion smaller than the above-described range leads to insufficiency in the UV-absorbing ability required in the present invention, while a proportion greater than the above-described range leads to inferior physical properties as a polymer and also to a cost rise. In particular, the present invention can exhibit the effect to improve the light resistance of a pigment even when a block copolymer obtained by reducing the proportion of an addition-polymerizable monomer having a UV-absorbing group, for example, to from 10 to 30 mass % is used. This is presumably attributable to the effective absorbability of UV light by the polymer block of B chain, because in a preferred embodiment of the present invention, it is specified that 70% or more of the addition-polymerizable monomer having the UV-absorbing group, which forms the polymer (block copolymer) to be used, are concentrated on the polymer block of B chain which forms the polymer (block copolymer). Further, because a block copolymer having many aromatic rings as UV-absorbing groups in its structure is more preferably used as described above, the block copolymer is considered to have strong miscibility with the pigment, thereby making it possible to contribute to the dispersion and encapsulation and to obtain a resin-treated pigment in a good form.

As the polymer for use in the present invention contains, as constituent monomer units thereof, the addition-polymerizable monomer, which has the UV-absorbing group, in a range of from 5 to 70 mass %, another polymerizable monomer such as that to be described below is also used in combination. As such another polymerizable monomer, conventionally-known polymerizable monomers such as those to be described below can each be used. Illustrative are olefin monomers such as ethylene and propylene; vinyl monomers such as styrene, vinyl toluene, vinyl acetate and (meth)acrylonitrile; and (meth)acrylates, (meth)acrylamides, and the like. In the present invention, the inclusion of a styrene-based vinyl monomer or a (meth)acrylate is preferred, with the inclusion of at least a (meth)acrylate monomer being more preferred, for the readiness in obtaining the block copolymer. It is also possible to use a monomer having a functional group such as a carboxyl group, sulfonic group, phosphoric group, amino group, quaternary ammonium group, epoxy group, isocyanate group, oxetanyl group, or hydroxyl group. A polymer, which contains as constituent monomer units thereof a monomer having such a functional group, can be also used.

The A-B block copolymer, which can be suitably used as an acrylic polymer in the present invention, can be obtained by using such monomers as described above. The polymer block of A chain in its structure may preferably be a polymer block which is compatible (miscible) with a dispersion medium when the resin-treated pigment according to the present invention is dispersed in a dispersion medium to prepare a pigment dispersion. However, no particular limitation is imposed on its monomer composition. Suitable monomer species may be selected in view of the dispersion medium to be used, and may be copolymerized and used. When the dispersion medium is water, for example, preferred is one obtained by copolymerizing monomers having an acid group such as a carboxyl group, sulfonic group or phosphoric group, an amino group such as a dimethylamino group, or a glycol chain such as a polyethylene glycol chain. In the case of acid groups, they can be neutralized and ionized with an alkaline substance so that the polymer block of A chain can be solubilized in water. In the case of amino groups, they can be neutralized and ionized with an acidic substance so that the polymer block of A chain can be solubilized in water, or they can be quaternized with a hydrocarbon halide or sulfuric acid ester so that the polymer block of A chain can be solubilized in water. In the case of glycol chains, the A-B block copolymer suitable in the present invention can be solubilized in water by the action of solubilization of glycol chains in water based on hydrogen bonds.

In particular, the polymer block of A chain may preferably be a polymer block having carboxyl groups, because this polymer block ca be solubilized in water by neutralizing the carboxyl groups with a neutralizing substance. Further, the use of an amine as the neutralizing substance can achieve water insolubilization by the vaporization of the amine when the resulting resin-treated pigment is used in products. It is, therefore, desired to use an amine as a neutralizing substance when water resistance is needed for a product. The proportion of carboxyl groups in the polymer block of A chain can be specified by the acid value of the polymer block of A chain, and may be preferably set at from 50 to 250 mgKOH/g. A proportion smaller than 50 mgKOH/g may be considered to result in a case where water solubilization may not be achieved sufficiently. On the other hand, a proportion greater than 250 mgKOH/g may be considered to result in too many carboxyl groups so that, even after the amine used as a neutralizing substance has evaporated to in solubilize the polymer block of A chain, water absorption or the like occurs to reduce the water resistance of the product.

As has been described above, the polymer block of A chain can be solubilized in water by neutralizing its acid groups such as carboxyl groups. As the neutralizing alkaline substance, no particular limitation is imposed, and those to be described below can each be used. Examples include ammonia; amines such as diethanolamine, triethylamine, diethanolamine and triisopropanol; terminal amines of polyalkylene glycols; alkali metal salts such as lithium hydroxide, sodium hydroxide, potassium hydroxide, sodium carbonate, calcium hydroxide and zinc hydroxide; and the like.

No particular limitation is imposed on the acid value of the whole A-B block copolymer based on the acid value originated from the above-described polymer block of A chain. When a pigment is treated with the A-B block copolymer, the polymer block of B chain adheres to the pigment and the polymer block of A chain is miscible with a dispersion medium. Therefore, the acid value derived from the polymer block of chain A is important.

A description will next be made about the polymer block of B chain, which constitutes the A-B block copolymer as an acrylic polymer suitably usable in the present invention. The polymer block of B chain is an acrylic polymer, which comprises as constituent monomer units preferably 70% or more, more preferably 80% or more of the mass of the whole addition-polymerizable monomer (UV-absorbing monomer) having a UV-absorbing group and contained in the polymer. The remainder of the UV-absorbing monomer may form the polymer block of A chain. What is particularly important in the A-B block copolymer for use in the present invention is the structure that UV-absorbing groups are concentrated on the polymer block of B chain. For the below-described reason, no problem arises even when the remaining UV-absorbing monomer makes up the polymer block of A chain. First, the amount of the UV-absorbing monomer that makes up the chain A is small compared with the amount of the UV-absorbing monomer that makes up the chain B, and therefore, does not contribute much to the UV-absorbing ability of the A-B block copolymer. Further, the compatibility (solubility) of the polymer block of A chain with the dispersion medium is equal to that of a polymer making use of another monomer so that a UV-absorbing monomer may be contained in the polymer block of A chain.

The polymer block of B chain may be a polymer formed of a UV-absorbing monomer in its entirety, or may be a polymer also comprising another addition-polymerizable monomer as constituent monomer units. It is especially important in the present invention that UV-absorbing groups concentrate on the B chain. As described above, it is important to design the monomer composition including the UV-absorbing monomer such that more preferably, 70% or more of the UV-absorbing groups can concentrate on the B chain.

A description will next be made about the molecular weight of the block copolymer, which contains UV-absorbing groups and is useful in the present invention. Each molecular weight used in the present invention means a polystyrene-equivalent number average molecular weight (hereinafter abbreviated as "Mn") by gel permeation chromatograph (hereinafter abbreviated as "GPC"), and each weight average molecular weight/number average molecular weight is used as a molecular weight distribution (which may hereinafter be abbreviated as "PDI") that indicates the distribution of the molecular weight. The Mn of one of the polymer blocks is measured by GPC, but the molecular weight of the other polymer block is calculated as a value obtained by subtracting the measured Mn of the one polymer block from the Mn of the whole block copolymer. These number average molecular weights may, therefore, be called simply "molecular weights" in some instances.

The molecular weight of the polymer block of A chain in the A-B block copolymer which contains UV-absorbing groups and is suitable for the present invention may preferably be from 1,000 to 20,000. A molecular weight lower than 1,000 may lead to inferior miscibility with a dispersion medium, while a molecular weight higher than 20,000 may result in a poor dispersion state due to entanglement of polymer chains even if dispersion is feasible.

The molecular weight of the polymer block of B chain may be preferably 20,000 or lower, more preferably 10,000 or lower. A molecular weight higher than 20,000 is unduly high so that plural pigment particles may be coated or aggregated together. The present invention is significantly characterized in that by controlling small the molecular weight of this polymer block of B chain and concentrating UV-absorbing groups as described above, pigment particles are efficiently encapsulated as microparticles to efficiently absorb UV light, and hence, to provide the pigment with improved light resistance.

Further, the overall molecular weight distribution may preferably be 1.6 or smaller. An A-B block copolymer of such a molecular weight distribution can be obtained by the block copolymer polymerization process of the present invention, which will be described subsequently herein. Such a narrow PDI can provide the polymer with uniform properties, and can bring about preferred results.

The present invention relates to a resin-treated pigment obtained by treating a pigment with the above-described block copolymer as a polymer that characterizes the present invention. The ratio of the pigment to the polymer (pigment: polymer) is from 50 to 95 to from 5 to 50. A pigment ratio of smaller than 50% leads to too much of the block copolymer when the resin-treated pigment according to the present invention is applied to a product, so that the block copolymer may become foreign matter to the product to lower its performance. A pigment ratio greater than 95%, on the other hand, leads to too little of the block copolymer, so that the performance of the block copolymer which characterizes the present invention may not be exhibited. The ratio of the pigment to the polymer (pigment:polymer) may be set more preferably at from 60 to 95 to from 5 to 40, still more preferably at from 75 to 95 to from 5 to 25.

The block copolymer for use in the present invention cannot be obtained by conventional radical polymerization, but can be obtained by anionic polymerization, cationic polymerization or living radical polymerization. Living radical polymerization is more preferable than anionic polymerization or cationic polymerization in that living radical polymerization requires milder polymerization conditions. As this living radical polymerization, a conventionally-known process can be used.

Examples of the conventionally-known process include the nitroxide mediated polymerization process (the NMP process) that makes use of dissociation and bonding of amine oxide radicals, the atom transfer radical polymerization (ATRP process) that conducts polymerization in the presence of a halogen compound as an initiator compound by using a heavy metal such as copper, ruthenium, nickel or iron and a ligand capable of forming a complex with the heavy metal, the reversible addition-fragmentation chain transfer polymerization (RAFT process) that conducts polymerization by using an addition-polymerizable monomer and a radical polymerization initiator in the presence of a dithiocarboxylate ester, a xanthate compound or the like as an initiator compound, the MADIX process (macromolecular design via interchange of xanthate), and the degenerative transfer process (DT process) that makes use of a heavy metal such as an organotellurium compound, organobismuth compound, organoantimony compound, antimony halide, organogermanium compound or germanium halide.

However, these living radical polymerization processes are accompanied by one or more problems for the production of the block copolymer useful in the present invention in that they require severe polymerization conditions and/or special compound or compounds. With the foregoing in view, the present inventors enthusiastically conducted research, and found the production process of the present invention which uses living radical polymerization. According to the production process of the present invention which uses the below-described living radical polymerization, a block copolymer can be obtained with the structures of the respective polymer block chains being controlled in specific forms, and in particular, the A-B block copolymer suitable for use in the present invention can be readily obtained.

Described specifically, according to the production process of the present invention for the resin-treated pigment, by a living radical polymerization process that uses an addition-polymerizable monomer having a UV-absorbing group, at least an iodine compound as an initiator compound, and as a catalyst, a compound selected from the group consisting of phosphorus compounds, nitrogen compounds, oxygen compounds and carbon compounds all of which can extract an iodine atom, the above-described A-B block copolymer is readily synthesized and a pigment is treated using the A-B block copolymer so obtained. More specifically, as the catalyst which can extract an iodine atom, a phosphorus compound such as a phosphorus halide, phosphite compound or phosphinate compound, a nitrogen compound such as an imide compound, hydantoin compound, barbituric acid compound or cyanuric acid compound, an oxygen compound such as a phenolic compound, iodoxyphenyl compound or vitamin, or a carbon compound such as a diphenylmethane compound, cyclopentadienes or acetoacetyl compound is used.

The above-described polymerization method to be conducted in the present invention is novel living radical polymerization which has been found by the present inventors and is different from the radical polymerization or living radical polymerization conducted to date. Described specifically, different from the conventional living radical polymerization method, the living radical polymerization to be conducted in the present invention uses neither a metal compound nor a ligand, and does not need using a special compound such as a nitroxide compound, dithiocarboxylate ester or xanthate compound. This living radical polymerization can be readily conducted by simply using an organoiodide as an initiator compound and a catalyst specified in the present invention in combination in the conventionally-known radical polymerization that uses addition-polymerizable monomers and a radical generator as a polymerization initiator.

The above-described novel living radical polymerization method proceeds through a reaction mechanism represented by the below-described reaction formula, and is a reversible activation reaction of a dormant species, Polymer-X (P-X), into a propagating radical. Although this polymerization mechanism may vary depending on the kind of a catalyst to be used, the polymerization mechanism is considered to proceed as will be described next. In the reaction formula (I), P• generated from the polymerization initiator reacts to XA to form a catalyst radical A• in situ. A• acts as an activator for P-X, and owing to its catalytic effect, P-X is activated at high frequency.

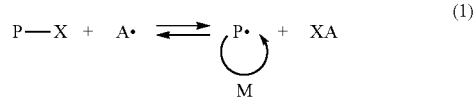

(1)

(X: I, A: P, N, O or C)

Described more specifically, a free radical generated from the polymerization initiator in the presence of the initiator compound with iodine (X) bonded thereto extracts an active hydrogen or active halogen atom from the catalyst to form a catalyst radical A•. This A• then extracts X from the initiator compound to form XA. The initiator compound, therefore, becomes a radical, to which a monomer polymerizes so that X is immediately extracted from XA to prevent any termination reaction. Under heat or the like, A• extracts X from the end X to form XA and an end radical. To this end radical, the monomer reacts so that X is immediately given to the end radical to stabilize the end radical. Through repetition of the above-described reaction, the polymerization proceeds to permit control of the molecular weight and structure. It is, however, to be noted that the above-described polymerization method may be accompanied by a bimolecular termination reaction or disproportionation as a side reaction in some instances.

A description will be made about the individual components to be used in the living radical polymerization which is to be conducted in the present invention. The initiator compound, which is to be used in the living radical polymerization, can be a conventionally-known organoiodide, and is not specifically limited. Particularly preferred are alkyl iodides containing an aromatic ring, such as 2-iodo-1-phenylethane and 1-iodo-1-phenylethane; cyano-containing iodides such as 2-cyano-2-iodopropane, 2-cyano-2-iodobutane, 1-cyano-1-iodocyclohexane and 2-cyano-2-iodovaleronitrile; and the like.

As these compounds, their commercial products can be used as they are. They can also be produced by conventionally-known processes. They can be obtained, for example, through reactions of azo compounds such as azobisisobutyronitrile with iodine, or by subjecting organohalide compounds, which are similar to the above-described organoiodides except for the substitution of their iodine atoms with other halogen atoms such as bromine or chlorine atoms, to halogen exchange reactions with iodide salts such as quaternary ammonium iodide and sodium iodide. It is to be noted that no particular limitation is imposed on their production processes.

In particular, the reaction between an azo compound and iodine does not need to synthesize an initiator compound beforehand. By adding iodine and the azo compound upon polymerization and conducting the polymerization, an initiator compound is formed in situ so that the polymerization proceeds. Therefore, the reaction between the azo compound and iodine is very easy and is preferred.

The catalyst for use in the present invention extracts the iodine atom from the above-described initiating compound to form a radical. Usable examples include organic phosphorus compounds, organic nitrogen compounds, organic oxygen compounds, organic compounds containing an active carbon atom, and the like. The phosphorus compounds include iodine-containing phosphorus halides, phosphite compounds and phosphinate compounds. The nitrogen compounds include imide compounds and hydantoin compounds. The oxygen compounds include phenolic compounds, iodoxyphenyl compounds and vitamins. The organic compounds, which contain an active carbon atom, include organic compounds such as cyclohexadiene, diphenylmethane and acetoacetyl compounds. In the present invention, one or more of these compounds can be selected.

These compounds are not particularly limited, and will be specifically exemplified hereinafter. As the phosphorus compounds, iodine-containing phosphorus halides, phosphite compounds and phosphinate compounds can be used. Examples of such phosphorus compounds include phosphorus triiodide, diethyl phosphite, dibutyl phosphite, ethoxyphenyl phosphinate, phenylphenoxy phosphinate, and the like.

As the nitrogen compounds, there are imide compounds and hydantoin compounds. Examples include succinimide, 2,2-dimethylsuccinimide, maleimide, phthalimide, 4-methylphthalimide, 4-nitrophthalimide, N-iodosuccinimide, hydantoin, diiodohydantoin, and the like.

As the oxygen compounds, phenolic compounds each of which has a hydroxyl group (phenolic hydroxyl group) bonded to an aromatic ring, iodoxyphenyl compounds as iodides of the phenolic hydroxyl groups, and vitamins. Examples of the phenolic compounds include phenol, hydroquinone, methoxyhydroquinone, t-butylphenol, t-butylmethylphenol, catechol, resorcinol, di-t-butylhydroxytoluene, dimethylphenol, trimethylphenol, di-t-butylmethoxyphenol, and the like. As these compounds are incorporated as polymerization inhibitors for the preservation of monomers, catalytic effects can also be exhibited by using commercially-available monomers as they are without purification. The iodoxyphenyl compounds include thymol diiodide and the like, and the vitamins include vitamin C, vitamin E and the like As the organic compounds with an active carbon atom contained therein, cyclohexadiene, diphenylmethane, acetylacetone and the like can be mentioned.

The amount of the above-described catalyst is less than the number of moles of the polymerization initiator. An excessively large number of moles results in overcontrol of the polymerization so that the polymerization does not proceed.

Next, as the polymerization initiator (which may also be called "the radical generator") for use in the present invention, a conventionally-known polymerization initiator can be used. No particular limitation is imposed on it, and commonly-employed organic peroxides and azo compounds can be used. Specific examples include benzoyl peroxide, dicumyl peroxide, di-t-butyl peroxide, 2,2'-azobis(isobutyronitrile), 2,2'-azobis(2,4-dimethylvaleronitrile), 2,2'-azobis(isobutyrate), 2,2'-azobis(methoxydimethylvaleronitrile) and the like.

The polymerization initiator can be used as much as preferably from 0.001 to 0.1 molar times, more preferably from 0.002 to 0.05 molar times the number of moles of the monomer, because an unduly small use amount of the initiator results in insufficient polymerization while an excessively large use amount of the initiator has a potential problem that a polymer of the addition-polymerizable monomer alone may be formed.

By using at least the organoiodide as an initiator compound, the addition-polymerizable monomers having a UV-absorbing group, the polymerization initiator and the catalyst and conducting polymerization as described above, the acrylic polymer, for example, the block copolymer for use in the present invention, and further the A-B block copolymer specified in the present invention can be easily obtained. The polymerization may be conducted in bulk (as bulk polymerization) without using any organic solvent, but solution polymerization that uses a solvent is preferred. No particular limitation is imposed on the organic solvent to be used, but the below-described organic solvents can be used. Examples include hydrocarbon solvents, alcohol solvents, glycol solvents, ether solvents, ketone solvents, ester solvents, halogenated solvents, amide solvents, sulfoxide solvents, and the like. These solvents are used either as a single system consisting of one of them or as a mixed solvent consisting of two or more of them. Any organic solvent can be used in the present invention insofar as it can dissolve the initiator compound in the form of the organoiodide, the catalyst, the addition-polymerizable monomers and the polymerization initiator to be used in the present invention.

The solid content (monomer concentration) in the polymerization mixture obtained by the method as described above may be preferably from 5 to 80%, with from 20 to 60% being more preferred, both on a weight basis, although no particular limitation is imposed thereon. If the solid content is lower than 5%, the monomer concentration is so low that the polymerization may not be brought to completion. On the other hand, polymerization at a solid content of higher than 80 mass % or bulk polymerization may lead to a polymerization mixture having unduly high viscosity, and hence, to a potential problem that stirring may become difficult or the polymerization yield may be reduced.

The polymerization temperature is not particularly limited, and may be preferably from 0° C. to 150° C., more preferably from 30° C. to 120° C. The polymerization temperature should be adjusted depending on the half-life of each polymerization initiator. Although it is preferred to continue the polymerization until the monomers are used up, the polymerization time is not particularly limited and may be, for example, from 0.5 hour to 48 hours, and as a practical time, preferably from 1 hour to 24 hours, more preferably from 2 hours to 12 hours.

The polymerization atmosphere is not particularly limited, and the polymerization may be conducted in air. In other words, oxygen may exist in a usual range in the system, or if necessary, the polymerization may be conducted under a nitrogen stream to eliminate oxygen. As the materials to be used in the polymerization, commercial products can be used as they are although impurities may be removed by distillation or with activated carbon or alumina. Further, the polymerization may be conducted under shading, but no problem arises even when the polymerization is conducted in a transparent vessel such as a glass vessel.

By polymerizing addition-polymerizable monomers, each of which contains a UV-absorbing group, in the presence of an organoiodide as an initiator compound while using at least the polymerization initiator and catalyst, the A-B block copolymer suitable for use in the present invention can be easily obtained.

Especially in the present invention, it is more preferred to use only methacrylates as the addition-polymerizable monomers which have a UV-absorbing group and are to be used in the polymerization, because in the above-described polymerization process to be employed in the present invention, the methacrylates result in a narrower molecular weight distribution and a better blocking efficiency. Such features are considered to contribute to the stability of end iodine atoms in the polymerization process to be used in the present invention.

A description will next be made about the process of the present invention, to which the above-described process is applied, for the polymerization of the block copolymer. In the synthesis of the block copolymer by the polymerization process used in the present invention, a monomer, which is to constitute the polymer block of A chain, is polymerized using a monofunctional organoiodide as an initiator compound. The polymer obtained as described above is stable because it has been substituted with an iodine atom at an end thereof. Another monomer which is to form the polymer block of B chain is next added, and by dissociating the iodine atom under heat or the like, polymerization can be initiated again. A block copolymer of desired structure can be obtained accordingly.

As methods for forming the A-B block copolymer of the specific structure for use in the present invention, there are the below-described methods. For example, a polymer block (B block) having UV-absorbing groups as specified in the present invention may be first polymerized, and another monomer may then be polymerized to form the A-B block copolymer. As an alternative, after the polymerization of a polymer block (A block) that is soluble in a solvent, a monomer having a UV-absorbing group may be added to form the A-B block copolymer. As a further alternative, as described above, monomers which can react with a UV-absorbing compound may be polymerized in the above-described order, and the UV-absorbing compound may then be added and reacted to form the A-B block copolymer.

As a still further alternative, after one of the polymer blocks is obtained, the one polymer block is collected by precipitation or the like, and the other monomer may then be added and polymerized. As an even further alternative, after one of the polymer blocks has been polymerized to preferably 50% or more, more preferably 70% or more, the other monomer may be added and polymerized without collecting the one polymer block. The addition of the other monomer can be made at once, or can be made dropwise by a dropping device. Dropwise addition makes it possible to impart a gradient to the concentration of the monomer in the polymer block of B chain, that is, to readily provide a gradient polymer. Described more specifically, the polymer block of B chain can be readily formed into the desired structure that UV-absorbing groups concentrate there. Whichever of the above-described methods is employed, the formation of the A-B block copolymer with the specific structure for use in the present invention requires that 70% or more of the whole monomer having a UV-absorbing group selectively enter the one polymer block.

In the polymerization to be used in the present invention, the molecular weight of the resulting polymer can be controlled depending on the amount of the initiator compound. Described specifically, by setting the number of moles of each monomer relative to the number of moles of the initiator compound, the resulting polymer can be controlled to a desired molecular weight or the magnitude of its molecular weight can be controlled. When 500 moles of a monomer having a molecular weight of 100 are used and polymerized by using 1 mole of the initiator compound, for example, the molecular weight is calculated to be $1 \times 100 \times 500 = 50,000$. Namely, a preset molecular weight can be calculated by the following formula: [Initiator compound 1 mole×the molecular weight of a monomer×the molar ratio of the monomer to the initiator compound].

In some instances, however, the polymerization method to be used in the present invention may be accompanied by a side reaction such as bimolecular termination or disproportionation, so that the actual molecular weight may not be controlled to the above-described calculated molecular weight. Preferred is a polymer obtained without such a side reaction. Nonetheless, the polymer may have a greater molecular weight as a result of coupling or a smaller molecular weight as a result of termination. Further, the rate of polymerization may not be required to be 100%. In this case, impurities such as monomers can be eliminated upon obtaining a resin-treated pigment subsequent to the encapsulation of a pigment through a reaction.

As an alternative, after the desired block copolymer is obtained, the polymerization initiator and catalyst may be added further to polymerize any remaining monomers for the completion of the polymerization. In so far as the block copolymer for use in the present invention has been formed or contained, no problem arises even if the individual polymer blocks are separately contained.

Iodine atoms are used in the production process of the present invention. Although these iodine atoms may be used in a bonded state, it is preferred to have them liberated beforehand from molecules to facilitate their removal. The liberation method can be a conventionally-known method, and no particular limitation is imposed thereon. These iodine atoms may be liberated by heating, may be liberated by adding an acid or alkali, or may be dissociated by adding sodium thiosulfate or the like. As the present invention includes a washing step in the treatment of the pigment, the used iodine atoms can be removed in the washing step.

The block copolymer for use in the present invention can be obtained as described above. The block copolymer can be precipitated to use it as a powder, or can be used as a resin solution after the completion of the polymerization.

The resin-treated pigment of the present invention, which is provided with improved light resistance and dispersibility, can be obtained by treating such a pigment as exemplified above with the block copolymer containing UV-absorbing groups and easily obtained by the above-described production process. Their mass ratio (pigment:polymer) differs depending on the proportion of UV-absorbing groups contained in the block copolymer to be used, but is set in the range of from 50 to 95 to from 5 to 50. When the amount of the pigment is greater than 95%, the pigment cannot be provided with improved light resistance even if the used block copolymer is formed of a UV-absorbing monomer in its entirety. In a resin-treated pigment in which the amount of the pigment is smaller than 50%, on the other hand, the content of the pigment is too little compared with that of the polymer and, when the resin-treated pigment is applied to a product, the properties of the block copolymer, which characterizes the present invention, as a polymer may lower the performance of the product. The mass ratio of the pigment to the polymer (pigment:polymer) may be more preferably from 60 to 95 to from 5 to 40, still more preferably from 75 to 95 to from 5 to 25. In the present invention, the treatment of the pigment with such a small amount of the polymer can effectively provide the pigment with improved light resistance.

A description will next be made about the resin-treated pigment obtained by treating with the above-described block copolymer which characterizes the present invention.

As methods for obtaining, as a pigment preparation, the resin-treated pigment of the present invention, the following two methods can be mentioned, for example.

[1] In the step that milling or kneading is conducted to achieve pigmentation and ultrafine grinding while using an inert salt or the like as needed, the above-described block copolymer is added as a powder, solution or neutralized aqueous solution at the same time or after ultrafine grinding has proceeded to some extent, and pigmentation and ultrafine grinding is conducted. The salt is then removed by precipitating it in water, an acidic aqueous solution or the like. Further, the pigment is coated by simply precipitating the resin in water when the resin is insoluble in water or by changing the pH when the resin has been neutralized.

[2] Using an ultrafinely ground pigment or its water paste, mixing, stirring and dispersion is conducted in the coexistence of the block copolymer of the above-described construction in a liquid medium. Subsequently, a poor solvent for the block copolymer is added or, when the block copolymer of the above-described construction has carboxyl groups and has been neutralized with an alkaline substance, the pH is adjusted to neural to acidic, whereby the resin is precipitated to coat or treat the pigment.

These methods will be described individually. The pigmentation and ultrafine grinding step of the pigment, which is conducted in the method [1], is conducted by a conventional method. No particular limitation is imposed on the ultrafine grinding method. For example, however, kneading may be conducted at room temperature or under heat for from 30 minutes to 60 hours, preferably from 1 hour to 12 hours by a conventionally-known kneading machine such as a kneader, extruder, ball mill, two-roll mill, three-roll mill, or flusher. It is also preferred to make combined use of a carbonate salt, chloride salt or the like as an ultrafine medium in the system to conduct ultrafine grinding under kneading as needed, and also, to make combined use of a viscous solvent such as glycerin, ethylene glycol or diethylene glycol to conduct the ultrafine grinding under lubrication, as needed. Such a salt as described above may be used in an amount as much as from 1 to 30 times, preferably from 2 to 20 times the pigment. Upon conducting the milling, the above-described block copolymer, which characterizes the present invention, can be added to conduct its ultrafine grinding at the same time. As an alternative, the above-described block copolymer can be added and mixed subsequent to the ultrafine grinding.

After the pigment has been formed into microparticulates as intended or has been sufficiently and uniformly mixed, the resulting mixture is poured into water to remove the salt, or is poured into acidic water or alkaline water to remove the salt while precipitating the resin. When such processing is conducted, the above-described block copolymer which characterizes the present invention can precipitate to treat the pigment.

In the method [2], to the powdery pigment or the pigment in the form of the water paste, the liquid medium, the block copolymer, and a pigment dispersant as needed, and further, an additive such as an antifoaming agent as needed are added. The resulting mixture is dispersed into a dispersion of the pigment in the liquid medium by a conventionally-known method. The concentration of the pigment at this time may be from 1 to 50%, preferably from 5 to 30%, both on a mass basis. A pigment concentration of lower than 1% is a low concentration, and therefore, the viscosity is so low that the energy of the dispersion does not propagate. A pigment concentration of higher than 50%, on the other hand, provides the dispersion with low flowability, and therefore, is not desired.

Upon conducting mixing, stirring and dispersion, a conventionally-known method can be carried out by using a conventionally-known stirrer or disperser, and no particular limitation is imposed in this respect. As the stirrer, a dissolver, homogenizer or the like can be mentioned. As a dispersion method, dispersion making use of a bead mill disperser, ultrasonic disperser or emulsifier can be mentioned. Dispersers usable in the present invention include, for example, a kneader, attritor, ball mill, sand mill or medium-containing horizontal disperser making use of a glass medium, zircon medium or the like, colloid mill, ultrasonic disperser, and the like.

Particularly preferred in the present invention is beads dispersion or ultrasonic dispersion. It is possible to use a method that conducts dispersion by using very small beads or a method that conducts high-output ultrasonic dispersion. The state of dispersion can be determined by a conventionally-known method, for example, by conducting a microscopic observation or measuring the particle size with a particle size analyzer. The average particle size in the above determination may be, but is not particularly limited to, preferably 300 nm or smaller, more preferably 150 nm or smaller, still more preferably 80 nm or smaller.

Centrifugal filtration or filtration through a filter may then be conducted to remove coarse particles from the dispersion of the pigment in the liquid medium. The liquid dispersion of the pigment as obtained as described above is then poured into a poor solvent or subjected to a pH adjustment as described above, whereby the pigment is treated with the above-described block copolymer which characterizes the present invention.

When the block copolymer is precipitated by adjusting the pH to neutral to acidic, the pH adjustment may be conducted after diluting the above-obtained liquid dispersion of the pigment preferably to a pigment concentration of from 5 to 10 mass % or so, because the liquid dispersion undergoes a significant increase in viscosity when the block copolymer is progressively precipitated with an acid. The dilution makes it possible to conduct smooth stirring. As an acidic substance for the adjustment of the pH, a conventionally-known acidic substance can be used, and no particular limitation is imposed thereon. Usable examples include inorganic acids such as hydrochloric acid, sulfuric acid and nitric acid, and organic acids such as acetic acid, propionic acid and lactic acid.

When filtration is conducted subsequent to the precipitation, the filtration takes time if the particle size is small. To have the particles aggregated and also have the block copolymer adsorbed firmly on the pigment surfaces, the liquid dispersion of the pigment may be heated, for example, to from 50 to 80° C.

Upon precipitation treatment, the salt comes out. It is, therefore, preferred to fully remove this salt and then to conduct filtration and washing. The resulting pigment paste may be used as it is, or may be dried into chips, ground into a powder, and then used. By one of the above two methods, the resin-treated pigment according to the present invention can be obtained.

A description will next be made about the pigment dispersion according to the present invention, which is obtained by using the resin-treated pigment of the present invention.

The pigment dispersion according to the present invention comprises at least the resin-treated pigment of the present invention and a dispersion medium. The dispersion medium can be either a liquid medium or a solid medium. Illustrative of the liquid medium are water, organic solvents, monomers and the like, while illustrative of the solid medium are thermoplastic resins, thermosetting resins, UV/ER-curable resins, and the like.

A description will first be made about a case in which the dispersion medium is a liquid medium. When the liquid medium is water or a water-soluble organic solvent, a water-based pigment dispersion is obtained. When the liquid medium is an organic solvent, an oil-based pigment dispersion is obtained. When the liquid medium is a monomer, a pigment dispersion in the monomer is obtained. This pigment dispersion in the monomer can be used in UV-curable paints and the like. No limitation is imposed on the chemical substances of these liquid media.

The pigment dispersion comprises at least the resin-treated pigment of the present invention and a liquid medium, and a pigment dispersant can also be used as needed. As the pigment dispersant, conventionally-known pigment dispersants such as those to be described below can each be used. Examples include the polyacrylic type, polystyrene type, polystyrene acrylic type, polyacrylic polyurethane type, polyester polyurethane type, polyether polyurethane type, polyester polyamide type, polyester type, polyether phosphate ester type, and polyester phosphate ester type. Further, various additives can also be added as needed. Usable examples include durability improvers such as antioxidants;

antisettling agents; release agents and releasability improvers; fragrances, antibacterial agents and antimold agents; and plasticizers, antidrying agents, and the like. In addition, dispersion aids, dyes and the like can also be added as needed.

A dispersion of a pigment in a liquid medium can be obtained by conducting dispersion by the above-described method. The average particle size of the dispersion is not particularly limited, but may be preferably 300 nm or smaller, more preferably 150 nm or smaller, still more preferably 80 nm or smaller. This average particle size is similar to the particle size of an ultrafinely ground pigment, and therefore, is preferred.

The pigment dispersion in the liquid medium can be obtained as described above, and the pigment dispersion can be used as a colorant in various oil-based products known to date. Specifically, it can be applied as a colorant for inks, paints, coating formulations, and IT-related coatings and inks. More specific examples include paints such as automotive paints, metal paints and building material paints; inks such as gravure inks, offset inks, flexographic inks and UV inks: IT-related coatings and inks, such as oil-based inkjet inks, UV inkjet inks, colors for image displays, and wet-type toners; coatings such as coatings for plastic surfaces and UV coatings; inks for stationery oil pens; spin-dyeing pigments for fibers; and the like. The pigment dispersion is used at pigment concentrations commensurate with the respective applications.

A description will next be made about a case in which the dispersion medium is a solid medium. Solid media include thermoplastic resins, thermosetting resins, and UV/ER-curable resins. More specifically, the thermoplastic resins include polyolefin resins, polyester resins, polyamide resins, polycarbonate resins, polyacrylic resins, polyether resins, polyvinyl chloride resins, polyurethane resins, polyvinyl acetate resins, polyvinyl alcohol resins, and the like. The thermosetting resins include epoxy resins, polyester resins, melamine resins, urea resins, phenol resins, and the like. The UV/ER-curable resins include resins obtained by bonding unsaturated bond-containing groups to the above-described thermoplastic resins.

The resin-treated pigment according to the present invention is applied to these solid media to obtain various products. First, at least the resin-treated pigment according to the present invention and a solid medium are kneaded, together with a processing aid and the above-described additive or additives added as needed, by a conventionally-known method. No particular limitation is imposed on the kneading method, and the kneading and dispersion is conducted at a predetermined pigment concentration, for example, by a mixing roll, Banbury mixer, kneader, kneader-ruder, single-screw extruder, multi-screw extruder, or the like. The pigment content differs depending on the application. A pigment dispersion in a solid medium can be obtained by such a method as described above, and can be diluted with resins, respectively, for use as colorants in various products.

When the solid medium is a thermoplastic resin, the pigment dispersion is cut into a sheet-shaped master batch or is formed into a pellet-shaped master batch by a pelletizer, and the resulting pigment dispersion is used as a colorant. In this case, the master batch obtained as described above is mixed together with such a resin as described above by a usual method in a Henschel mixer, super mixer, tumbler or the like, and is then molded or otherwise formed into various products by a mixing roll, injection molding machine, extruder, blow molding machine, inflation molding machine, compression molding machine, rotary molding machine, thermosetting resin molding machine, or the like. The pigment dispersion in the solid medium can also be used, as an information recording material, in a ground toner. In this application, the ground toner can also be obtained basically by the above-described method.

Colored plastic products molded or otherwise formed by the above-described method include containers (food containers, cosmetic containers, medicine containers, etc.), films, sheets, blister packs, pipes, hoses, tubes, beads, fibers, automobile parts and components (vehicle interior trims and the like), electric equipment parts and components (housings and the like of electric appliances), stationery, toys, games, dolls and the like, furniture (wardrobe storage products), household goods (kitchen utensils, bathroom utensils), and so on. The resin-treated pigment according to the present invention is characterized especially in that it can be applied to fields where the untreated pigment has heretofore been unusable due to its inferior light resistance. When used in products for outdoor use, the resin-treated pigment according to the present invention exhibit still greater advantageous effects.

EXAMPLES

The present invention will next be described more specifically based on Synthesis Examples, Examples, Comparative Examples and Application Examples. However, the present invention shall not be limited at all by these Examples, and can be practiced as desired in light of the details described herein. It is to be noted that all designations of "parts" and "%" in the subsequent description are on a mass basis.

Synthesis of Polymers

Synthesis Example 1

A 1-L separable flask was fitted with a stirrer, nitrogen inlet tube, thermometer and condenser. Into the flask, tetrahydrofuran (hereinafter abbreviated as "THF"; 217.5 parts), diethylene glycol dimethyl ether (hereinafter abbreviated as "DMDG"; 217.5 parts), iodine (4.0 parts), 2,2'-azobis(2-methoxy-2,4-dimethylvaleronitrile) (product of Wako Pure Chemical Industries, Ltd., hereinafter described as "V-70"; 19.7 parts), 2-(2H-benzotriazol-2-yl)-4-[2-(methacryloxy)ethyl]phenol (product of Otsuka Chemical Co., Ltd., hereinafter described as "RUVA-93"; 169.3 parts), and as a catalyst, di-t-butylhydroxytoluene (hereinafter abbreviated as "BHT"; 0.88 parts) were charged. The resulting mixture was stirred into a solution. The solution was then heated to 40° C., at which polymerization was allowed to proceed for 6 hours. A portion of the polymerization mixture was sampled and measured for molecular weight by GPC. As a result, the number average molecular weight (Mn) was 3,500, and the molecular weight distribution (PDI) was 1.24. In a measurement of a spectral curve by a spectrophotometer, the peak derived from RUVA-93 as a monomer having UV-absorbing ability was not observed. As a consequence, the formation of an UV-absorbing polymer block with UV-absorbing groups contained therein (which may hereinafter be called simply "the UV-absorbing polymer block") was confirmed.

To the polymerization mixture obtained as described above, methyl methacrylate (hereinafter abbreviated as "MMA"; 280 parts) was then added, followed by polymerization at 40° C. for 5 hours and further at 70° C. for 2 hours to obtain a polymer solution. The solution was measured for solid content. As a result, the solid content was 48.6%, and the monomers were confirmed to be polymerized substantially in their entirety. The resultant polymerization product (solid matter) was measured for molecular weight by GPC. As a result, Mn was 6,800, and PDI was 1.36. Further, the peak of the molecular weight was confirmed to shift toward higher molecular weight compared with before the polymerization of MMA. From the foregoing, the polymerization product obtained as described above is considered to be a block copolymer formed of the UV-absorbing polymer block and polymethyl methacrylate (hereinafter abbreviated as "PMMA"). The PMMA was a polymer block miscible with a dispersion medium. As the molecular weight of this PMMA is the value obtained by subtracting the number average molecular weight of the UV-absorbing polymer block from the number average molecular weight of the whole block copolymer, Mn of the PMMA was 3,300. The amount of the UV-absorbing monomer (which will be referred to as "RUVA content" in Table 1) in the whole block copolymer was 28%, and substantially 100% of the amount of the UV-absorbing monomer concentrated on the UV-absorbing polymer block. It is to be noted that the other polymer block, such as the above-described PMMA, will hereinafter be called "a miscible polymer block".

The polymer solution obtained as described above was then added to a mixed solution of water (2,000 parts) and methanol (2,000 parts) under stirring by a disper mixer to precipitate the polymer. The polymer was collected by filtration, and thoroughly washed with water. Subsequently, the polymer was dried for 24 hours by a fan drier controlled at 70° C., and was then ground by a crusher. The ground polymer will hereinafter be called "B-UVA-1". This B-UVA-1 is a block copolymer having UV-absorbing benzotriazole groups. Further, a 0.5 ppm solution of B-UVA-1 in chloroform was prepared, and was measured for absorption wavelengths. Two absorption peaks appeared in the ultraviolet range at $\lambda_{max}$=304 nm and 344 nm, respectively.

Synthesis Examples 2 to 4

With various monomer compositions, a similar procedure as in Synthesis Example 1 was followed to obtain block copolymers having UV-absorbing groups as summarized in Table 1. The monomer composition and characteristics of the block copolymer synthesized in Synthesis Example 1 are also presented in Table 1. In each synthesis example, a similar solvent was used in an amount such that the solid content reached 50% when the polymer block was formed. Numerals in the table indicate the numbers of parts. Presented as the rate of polymerization of each UV-absorbing polymer block obtained at a midpoint was one determined from a peak of RUVA-93 as observed by GPC and the amounts of volatile monomers as measured by gas chromatography (hereinafter abbreviated as "GC"). It is indicated from Table 1 that in each synthesis example, substantially no monomers remained and the rate of polymerization was good. Described as the molecular weight of each miscible polymer block was a value which was obtained by subtracting the number average molecular weight of its UV-absorbing polymer block segment from the number average molecular weight of the whole block copolymer as mentioned above. In each synthesis example, the absorption wavelengths in the ultraviolet range had substantially the same values as in Synthesis Example 1. In each synthesis example, substantially 100% of the amount of the UV-absorbing monomer (RUVA content) in the whole block copolymer concentrated on one of the polymer blocks, that is, the UV-absorbing polymer block. It is to be noted that the abbreviations in Table 1 mean as follows.

SI: succinimide
NIS: N-iodosuccinimide
BzMA: benzyl methacrylate
CHMA: cyclohexyl methacrylate
BMA: butyl methacrylate
2EHMA: 2-ethylhexyl methacrylate
MAA: methacrylic acid
DPM: diphenylmethane

TABLE 1

Monomer Compositions and Characteristics of Synthesized Block Copolymers

| | | Synthesis Example | | | |
|---|---|---|---|---|---|
| | | 1 | 2 | 3 | 4 |
| Designation | | B-UVA-1 | B-UVA-2 | B-UVA-3 | B-UVA-4 |
| Iodine | | 4.0 | 1.0 | 1.0 | 1.0 |
| V-70 | | 19.7 | 4.9 | 4.9 | 4.9 |
| Catalyst | | BHT 0.88 | SI 0.05 | NIS 0.11 | DPM 0.17 |
| UV-absorbing polymer block | RUVA-93 | 169.3 | 32.3 | 32.3 | 32.3 |
| | CHMA | — | 16.8 | — | 16.8 |
| | BzMA | — | — | 17.6 | — |
| | MMA | — | — | — | 10.0 |
| | Content of RUVA | 100.0% | 65.8% | 64.7% | 54.6% |
| | Mn | 3,500 | 2,700 | 2,500 | 3,200 |
| | PDI | 1.24 | 1.46 | 1.44 | 1.40 |
| | Rate of polymerization | ≈99% | ≈99% | ≈99% | ≈99% |
| Miscible polymer block | MMA | 280 | 60.0 | 30.0 | 28.0 |
| | BMA | — | 85.2 | 28.4 | — |
| | 2EHMA | — | — | 19.8 | — |
| | MAA | — | — | — | 6.0 |
| | Molecular weight | 3,300 | 6,500 | 4,200 | 1,800 |
| Whole block copolymer | Mn | 6,800 | 9,200 | 6,700 | 5,000 |
| | PDI | 1.36 | 1.55 | 1.56 | 1.40 |
| | Solid content | 48.6 | 49.6 | 48.2 | 49.3 |
| | Content of RUVA | 28.0% | 16.6% | 25.2% | 34.7% |

Comparative Synthesis Example 1

Using a similar reactor as in Synthesis Example 1 except that two dropping funnels were fitted, THF (167.5 parts) and DMDG (167.5 parts) were added and heated to 50° C. In another vessel, MMA (280 parts) and RUVA-93 (169.3 parts) were combined, and were heated to 50° C. such that RUVA-93 was dissolved to provide a mixed monomer solution. Into a further vessel, THF (50 parts), DMDG (50 parts) and V-70

(19.7 parts) were charged. They were stirred into a homogeneous solution to provide an initiator solution. The mixed monomer solution was filled in one of the dropping funnels, the mixed initiator solution was filled in the other dropping funnel, and those mixed monomer solution and mixed initiator solution were added dropwise over 2 hours. After completion of the dropwise addition, polymerization was conducted for 6 hours.

A portion of the polymerization mixture was sample. The solid content was 49.1%. As no peak of RUVA-93 was observed by GPC, the monomers were confirmed to be polymerized substantially in their entirety. Further, the Mn and PDI by GPC were 6,300 and 2.13, respectively. Precipitation, filtration, drying and grinding were then conducted as in Synthesis Example 1. The resultant copolymer will be called "R-UVA-1".

The copolymer was a UV-absorbing copolymer (random copolymer) of the same monomer composition as in Synthesis Example 1. Its UV-absorbing monomer polymerized at random in the copolymer, and the copolymer contained 28% of the UV-absorbing monomer in total.

Synthesis Example 5

The procedure of Synthesis Example 1 was followed except for the use of 2-(4-benzoyl-3-hydroxyphenoxy)ethyl methacrylate as a UV-absorbing benzophenone monomer instead of RUVA-93. The Mn and PDI of the UV-absorbing polymer block were 3,200 and 1.44, respectively. The molecular weight of the miscible polymer block was 3,000. As the whole block copolymer, the Mn and PDI were 6,200 and 1.50, respectively. The amount of the UV-absorbing monomer in the whole block copolymer was 28%. A spectral curve was measured by a spectrophotometer. Two peaks appeared in the ultraviolet range, $\lambda_{max}$ wavelengths of which were 325 nm and 280 nm. From the foregoing, the resultant polymer was determined to be a benzophenone-based, UV-absorbing block copolymer. Substantially 100% of the amount of the UV-absorbing monomer in the whole block copolymer concentrated on one of the polymer blocks, that is, the UV-absorbing polymer block. The resultant block copolymer will be called "B-UVA-5".

Synthesis Example 6

Polymerization was conducted as in Synthesis Example 4 except for the use of 3-(4-(5'-chlorobenzotriazole)-3-hydroxyphenoxy)-hydroxypropyl methacrylate [which is a reaction product of glycidyl methacrylate with 5'-chloro-2-(2',4'-dihydroxyphenyl)-2H-benzotriazole; hereinafter called "MHBP"] instead of RUVA-93. The Mn and PDI of the resultant UV-absorbing polymer block were 3,100 and 1.53, respectively. The molecular weight of the miscible polymer block was 1,900. As the whole block copolymer, the Mn and PDI were 5,000 and 1.57, respectively. The amount of the UV-absorbing monomer in the whole block copolymer was 34.7%. A spectral curve was measured by a spectrophotometer. A single peak appeared, the wavelength of which was $\lambda_{max}$=350 nm. Substantially 100% of the amount of the UV-absorbing monomer in the whole block copolymer concentrated on one of the polymer blocks, that is, the UV-absorbing polymer block.

After the polymerization, a mixed solution of "BUTYL CARBITOL" (46.5 parts), 28% aqueous ammonia (4.6 parts) and water (41.9 parts) was added to neutralize carboxyl groups. The resulting solution was a substantially clear, yellow solution. Its solid content was 33.4%.

Upon addition of a portion of the above-described solution to a large amount of water, a clear bluish dispersion was obtained. Presumably, the UV-absorbing polymer block did not dissolve in water but turned into particles, while the miscible polymer block became soluble in water to provide the water dispersion. The resultant block copolymer will be called "B-UVA-6".

Synthesis Example 7

Using a similar reactor as in Synthesis Example 1, DMDG (329.1 parts), iodine (3.0 parts), V-70 (14.7 parts), BzMA (211.2 parts) and BHT (0.66 parts) were combined and polymerized at 40° C. for 7 hours. A portion of the polymerization mixture was sampled. The solid content was 38.8%, and the yield was 94%. Further, the Mn and PDI as measured by GPC were 5,000 and 1.43, respectively.

BzMA (52.8 parts) and methacryloxyethyl isocyanate (product of Showa Denko K.K., hereinafter abbreviated as "MOI"; 46.5 parts) were then added, followed by polymerization at the temperature of 40° C. for 5 hours. The resulting product was a polyBzMA-block-poly(BzMA/MOI) block copolymer. Its Mn and PDI were 6,500 and 1.39, respectively.

Charged, as a UV-absorbing compound, into another vessel was a mixture (desolvation product of "TINUVIN 400", product of Ciba Specialty Chemicals Inc.; 90 parts) of 2-[4-[(2-hydroxy-3-dodecylpropyl)oxy]-2-hydroxyphenyl]-4,6-bis(2,4-dimethylphenyl)-1,3,5-triazine and 2-[4-[(2-hydroxy-3-tridecylpropyl)oxy]-2-hydroxyphenyl]-4,6-bis(2,4-dimethylphenyl)-1,3,5-triazine. A mixture of DMDG (90 parts) and dibutyl tinlaurate (0.09 parts) was added, followed by a reaction at 80° C. for 3 hours. When measured by GPC, no peak of either of the UV-absorbing compounds as the raw materials was confirmed. Butylamine (3 g) was next added to react it with remaining isocyanate groups. The Mn and PDI of the resulting product was 10,000 and 2.01, respectively. Different from Synthesis Examples 1 to 6, Synthesis Example 7 formed the UV-absorbing polymer block subsequent to the formation of the miscible polymer block. The molecular weight of the UV-absorbing polymer block was 5,000.

Precipitation, filtration, drying and grinding were then conducted as in Synthesis Example 1 except that upon conducting the precipitation, ice was used in place of a half of the water to cool the contents below 5° C. and the grinding was conducted together with dry ice. The amount of the UV-absorbing monomers in the whole block copolymer was 22.4%. A spectral curve was measured by a spectrophotometer. Two peaks appeared, the wavelengths of which were $\lambda_{max}$=299 nm and 342 nm, respectively. This indicates that the block copolymer is a triazine-based UV-absorbing block copolymer. Substantially 100% of the amount of the UV-absorbing monomers in the whole block copolymer concentrated on one of the polymer blocks, that is, the UV-absorbing polymer block. The resultant block copolymer will be called "B-UVA-7".

Examples 1 to 7

A commercial ε-phthalocyanine blue pigment (C.I. PB 15:6; 100 parts), diethylene glycol (200 parts) and common salt (700 parts) were charged into a 3-L kneader. While controlling the kneader to maintain its temperature at from 100° C. to 120° C., grinding was conducted for 8 hours to obtain a kneaded mass. In another vessel, B-UVA-1 (10 parts) prepared in Synthesis Example 1 and propylene glycol monomethyl ether acetate (10 parts) were combined into a homogeneous mixture. The homogeneous mixture was added to the kneaded mass, directly followed by kneading for 2 hours.

A portion (800 parts) of the resulting kneaded mass was poured into water (2,000 parts), followed by stirring for 4 hours at high speed. Filtration and washing were then conducted to obtain a water paste (true content of pigment: 35.2%) of the kneaded pigment. Further, the water paste was dried at 100° C. for 24 hours by a fan drier, and the resulting dried product was ground by a crusher. The resultant ground product will be called "Resin-treated Pigment B-1" (pigment: polymer mass ratio=90.9:9.1).

Using various pigments and UV-absorbing block copolymers, resin-treated pigments of Examples 2 to 7, were then prepared as in Example 1. They are summarized in Table 2. The composition of the resin-treated pigment prepared in Example 1 is also presented in Table 2.

The resulting water-based pigment dispersion was then filtered, and the solid matter so collected was thoroughly washed with purified water to obtain a pigment paste (solid content: 30.5%). This will be called "Resin-treated Pigment Y-3" (pigment:polymer mass ratio=76.9:23.1).

Example 9

A pigment paste was obtained as in Example 8 except that a quinacridone pigment (C.I. PR-122, average particle size: 89 nm, solid content: 25%) was used in place of the yellow azo pigment (C.I. PY-74) and B-UVA-9 was used in lieu of B-UVA-6. B-UVA-9 used as described above had been obtained by a similar procedure as in Synthesis Example 6 except for the use of an aqueous solution (solid content: 35.3%) of sodium hydroxide (in an equivalent molar amount

TABLE 2

Compositions of Resin-treated Pigments

| Example | Designation of resin-treated pigment | Used pigment | Designation of used resin | Mass ratio Pigment:polymer |
|---|---|---|---|---|
| 1 | B-1 | ε-Copper phthalocyanine (C.I. PB 15:6) | B-UVA-1 | 90.9:9.1 |
| 2 | B-2 | ε-Copper phthalocyanine (C.I. PB 15:6) | B-UVA-5 | 90.9:9.1 |
| 3 | Y-1 | Azo pigment (C.I. PY-74) | B-UVA-2 | 90.9:9.1 |
| 4 | Y-2 | Azo pigment (C.I. PY-180) | B-UVA-4 | 90.9:9.1 |
| 5 | R-1 | Anthraquinone pigment (C.I. PR-177) | B-UVA-3 | 90.9:9.1 |
| 6 | R-2 | Diketopyrrole pigment (PR-254) | B-UVA-7 | 90.9:9.1 |
| 7 | G-1 | Polybrominated zinc phthalocyanine (PG-58) | B-UVA-7 | 90.9:9.1 |

Comparative Example 1

A comparative resin-treated pigment was obtained for the sake of comparison as in Example 1 except that B-UVA-1 used in Example 1 was changed to R-UVA-1 obtained in Comparative Synthesis Example 1. The resultant resin-treated pigment will be called "Comparative Resin-treated Pigment B-1" (pigment:polymer mass ratio=90.9:9.1).

Example 8

B-UVA-6 (210 parts) obtained in Synthesis Example 6, diethylene glycol monobutyl ether (70 parts) and purified water (388 parts) were mixed into a homogeneous solution. The solution was clear, and was free of precipitation or turbidity.

To the solution, a water paste (average particle size: 98 nm, solid content: 35%; 1,000 parts) of the azo yellow pigment (C.I. PY-74) was added, followed by deflocculation for 30 minutes by a disper mixer. Using a medium-containing horizontal disperser, the pigment was fully dispersed to obtain a mill base. Purified water was added to the mill base such that the pigment content was adjusted to 18%. A water-based pigment dispersion was obtained accordingly.

The mill base obtained as described above was then poured into purified water (5,000 parts). Under stirring at high speed, a 5% aqueous solution of acetic acid was added dropwise to precipitate B-UVA-6. At that time, the pH was 9.5 at the beginning, and was then lowered to 4.1 by adding an acid.

to carboxyl groups) dissolved as a neutralizing agent therein instead of the aqueous ammonia. The solid content of the resultant pigment past was 29.3%. This will be called "Resin-treated Pigment M-1" (pigment:polymer mass ratio=76.9: 23.1).

Application Example 1

Application to Paint Products

Using Resin-treated Pigments B-1 and B-2 obtained in Examples 1 and 2, Comparative Resin-treated Pigment B-1 obtained in Comparative Example 1, and the untreated pigments used upon preparation of them, paints were prepared as will be described hereinafter.

First, each resin-treated pigment (or untreated pigment) (12 parts), an acrylic resin (toluene/MEK solution, solid content: 40%; 24 parts), toluene (5 parts), xylene (5 parts) and isobutyl acetate (5 parts) were mixed, and were charged in a 250-mL plastic bottle. Zirconia beads were filled in the plastic bottle, followed by dispersion for 2 hours on a paint shaker.

A urethane resin solution (solid content: 30%; 40.1 parts) and a thinner (45 parts) were added to the plastic bottle. After mixed further for 30 minutes, the beads were removed to prepare an acrylic urethane paint.

The paint was coated on a plywood plate by a bar coater No. 3, and exposed to UV light for 100 hours by "SUPER UV TESTER". A color difference between before and after the exposure was measured. The results are summarized in Table 3.

TABLE 3

Color Differences of Resin-treated Pigments and Untreated Pigment

| Used pigment | Color difference (ΔE) |
| --- | --- |
| Untreated | 2.74 |
| Resin-treated Pigment B-1 | 0.35 |
| Resin-treated Pigment B-2 | 0.68 |
| Comparative Resin-treated Pigment B-1 | 2.11 |

The untreated pigment was changed in color due to breakage of its ε-type crystal structure by UV light, whereas B-1 and B-2, the resin-treated pigments of the present invention, both underwent small color changes. With Comparative Resin-treated Pigment B-1, its color change was found to be relatively large despite the inclusion of the UV-absorbing copolymer. The resin used to treat the pigment in Comparative Resin-treated Pigment B-1 was a UV-absorbing copolymer, but was a random copolymer. Presumably, the resin was dissolved with the solvent system and was allowed to diffuse in the coatings, and as a result, the effect of the resin, which was used in the treatment, on the prevention of a UV deterioration of the pigment was reduced. In the present invention, on the other hand, it is presumed that the UV-absorbing polymer block which made up each block copolymer encapsulated the pigment or stayed in the vicinity of the pigment, absorbed UV light in the vicinity of the pigment, and therefore, was able to effectively prevent the UV deterioration of the UV degradation of the pigment. As readily appreciated from the foregoing, the use of the specific UV-absorbing block copolymer specified in the present invention for the treatment of a pigment can provide the pigment with improved light resistance with a significant difference. The resin-treated pigment according to the present invention is, therefore, considered to also become usable even in fields where depending on the species of the pigment, the pigment in its untreated form has heretofore been unusable due to its insufficient light resistance, and therefore, is expected to find increasing utility.

Further, Y-2, R-1 and R-2, the resin-treated pigments of other examples, were also found to have a color difference of 0.5 or smaller, and therefore, to be good in light resistance. When those pigments were used in an untreated form, their color differences were 2.00 or greater. Furthermore, coatings obtained using the resin-treated pigments of the present invention were all good in gloss and excellent in color developing properties.

Application Example 2

Application to Plastic Products

Resin-treated Pigment B-1 obtained in Example 1, Resin-treated Pigment Y-1 obtained in Example 3 and Resin-treated Pigment R-1 obtained in Example 5 (5 parts, each) were separately kneaded together with dioctyl phthalate (10 parts), which was added as a plasticizer, at 50° C. by a three-roll mill until they were fully dispersed, whereby three plasticizer pastes were obtained.

Those three plasticizer pastes were then separately rolled and kneaded at from 155 to 160° C. together with a clear compound of polyvinyl chloride resin to give a pigment content of 0.5%, so that three sheets were prepared. Those sheets were then separately pressed at 170° C. and under the pressure of 50 kg/cm² into a thickness of 5 mm. Three dark-colored sheets were produced accordingly.

Further, the three plasticizer pastes obtained as described above were also separately rolled and kneaded with a white compound of polyvinyl chloride resin to give a pigment content of 0.05%. Three light-colored sheets were produced accordingly.

For the sake of comparison, dark-colored and light-colored sheets were also produced similarly with respect to the pigment which had not been subjected to resin treatment and was in the untreated form.

The respective, dark-colored and light-colored sheets obtained as described above were exposed to UV light for 1,000 hours in a fadeometer to perform a light resistance test. The sheets which used the untreated pigments were apparently faded out into color colors, respectively. On the other hand, the sheets which used the pigments treated with the corresponding UV-absorbing block copolymers of the present invention remained visually unchanged in color, and their color differences before and after the exposure were all 1.00 or smaller in the case of the dark-colored sheets and 2.00 or smaller in the case of the light-colored sheets.

It has been confirmed by the above test that the use of the resin-treated pigments as colorants led to improved light resistance compared with the use of the untreated pigments. In addition, the plastic products all showed excellent results in hue, coloring power, transparency and dispersion properties.

Application Example 3

Application to Inkjet Inks

Using Resin-treated Pigment Y-2 obtained in Example 4, Resin-treated Pigment Y-3 obtained in Example 8 and Resin-treated Pigment M-1 obtained in Example 9 as colorants, respectively, three inkjet inks were produced as will be described hereinafter. Described specifically, using an aqueous solution of sodium hydroxide in an equivalent molar amount to the carboxyl groups derived from the resin in each resin-treated pigment, the resin-treated pigment and the aqueous solution of sodium hydroxide were first combined such that the resin-treated pigment accounted for 20%. The resulting mixture was diluted with "BUTYL CARBITOL" under stirring to give a pigment content of 19%, followed by stirring by a disper mixer.

The thus-obtained mixture was fully dispersed in a horizontal bead mill with 0.5-mm zirconia beads filled therein. The resulting dispersion was diluted with deionized water to give a pigment content of 15%. Coarse particles were removed by a filter to prepare a pigment dispersion.

Each pigment dispersion (100 parts) obtained as described above, deionized water (275 parts), 1,2-hexanediol (40 parts), glycerin (80 parts) and "SURFYNOL 465" (product of Air Products and Chemicals, Inc.; 5 parts) were combined. The resulting mixture was to centrifugal processing (8,000 rpm, 20 minutes) to remove coarse particles, followed by filtration through a 5-μm membrane filter. Inks of the respective colors were obtained accordingly. Those inks were separately filled in ink cartridges, and were then loaded on an inkjet printer. By the inkjet printer, solid printing was performed on inkjet glossy paper "PHOTOLIKE QP" (product of Konica Minolta Business Technologies, Inc.).

The respective prints obtained as described above were exposed to UV light for 10 hours by "SUPER UV TESTER". They were all found to have a color difference of 1.00 or smaller, and therefore, to be excellent in light resistance. For the sake of comparison, on the other hand, the untreated pigments were separately dispersed with an acrylic pigment dispersant, and pigment dispersions for inkjet inks and inkjet inks were similarly prepared. Printing was then performed as in the example to obtain prints, on which a UV exposure test was performed by "SUPER UV TESTER". As a result, their color differences were 2.00 or greater. Especially with the yellow pigments (i.e., PY-74 and PY-180), the prints were turned into a substantially uncolored state.

From the foregoing, the resin-treated pigments of the present invention were confirmed to be evidently provided with improved light resistance. Moreover, they were excellent in color developing properties, dispersion stability, gloss and color density.

Application Example 4

Application to Color Filter Products

A description will hereinafter be made by taking, as an example, one making use of Resin-treated Pigment R-2 of Example 6 as a colorant.

To an acrylic resin varnish (50 parts), R-2 (15 parts) obtained in Example 6, a polyester-polyamide dispersant (10 parts) and PGMAc (25 parts) were added. Subsequent to premixing, the resultant mixture was dispersed in a horizontal bead mill to obtain a pigment dispersion. Used as the acrylic resin varnish was a solution (solid content: 40%) of a copolymer in PGMAc. The copolymer had been obtained by copolymerizing benzyl methacrylate, methacrylic acid and 2-hydroxyethyl methacrylate at a molar ratio of 70/15/15, and had a molecular weight of 12,000 and an acid value of 100. As the polyester-polyamide dispersant, a reaction product of polycaprolactone and polyethylenimine in the presence of 12-hydroxystearic acid as an initiator was used with a solid content of 460.

The average particle size of the pigment in the pigment dispersion obtained as described above was measured. The average particle size was found to be approximately 45 nm. Its viscosity was 6.6 mPa·s. For the sake of comparison, a pigment dispersion was also obtained in a similar manner as described above by using the same untreated pigment as that used in the preparation of R-2.

The two pigment dispersions obtained as described above were separately used as colors for image displays. Described specifically, each pigment dispersion (100 parts), the acrylic resin varnish (50 parts), trimethylolpropane triacrylate (10 parts), 2-hydroxy-2-methylpropiophenone (2 parts), 2,2-diethoxyacetophenone (1 parts) and PGMAc (37 parts) were combined. In this manner, two R (red) resist colors making use of the pigment dispersions, one containing the resin-treated pigment and the other the untreated pigment, were obtained, respectively.

A glass substrate, which had been subjected to treatment with a silane coupling agent, was next set on a spin coater, and each resist color obtained as described above was spin-coated under the conditions of first 300 rpm for 5 seconds and then 1,200 rpm for 5 seconds. The thus-applied coating was then prebaked at 90° C. for 5 minutes.

The glass substrates obtained as described above were exposed to UV light for 1,000 hours by "SUPER UV TESTER". As a result, the glass substrate obtained using the resist color with the untreated pigment contained therein was confirmed to become a lighter color to the eyes. The color difference was 3.1. With the glass substrate obtained using the resist color with the resin-treated pigment of the present invention contained therein, the color difference was 1.1. Therefore, the light resistance was clearly improved.

In a liquid crystal TV set or the like that makes use of color filters, there is UV light emitted from the light sources. Although such UV light is cut out, the color filters are exposed to light whenever the liquid crystal TV set is on. TV images may, therefore, become lighter in color or yellowish. By using resin-treated pigments according to the present invention, which are evidently provided with improved light resistance as described above, to cope with the above-mentioned problem, color filters are considered to be provided with an improved service life.

Using the glass plates obtained as described above, characteristics as a color filter when the resin-treated pigment of the present invention was used were studied. The color filter making use of the resin-treated pigment had excellent spectral curve characteristics which were by no means inferior compared with the color filter making use the untreated pigments, and in addition, was confirmed to be excellent in durability such as light resistance and heat resistance, to also have superb properties in contrast and light transmission, and to show outstanding characteristics for the display of images. Especially when the color filter plate of the application example of the present invention was heated at 270° C. for 10 minutes, the percent retention of contrast before and after the heating was 90% so that excellent heat resistance was exhibited. From the foregoing, the resin-treated pigment of the present invention was confirmed to be a pigment which can also withstand heat.

A test was performed as described above except that Resin-treated Pigment B-2 of Example 2, Resin-treated Pigment R-1 of Example 5 and Resin-treated Pigment G-1 of Example 7 were used as colorants. Their use was confirmed to provide improved light resistance and heat resistance.

INDUSTRIAL APPLICABILITY

As application examples of the present invention, resin-treated pigments obtained by treating pigments with UV-absorbing block copolymers can be used as colorants useful in products such as, for example, building materials, automobile paints and outdoor displays, because these resin-treated pigments are optimal especially for applications where they are exposed to sunlight. In addition, the resin-coated pigments are provided with light resistance clearly improved over the untreated pigments used as raw materials, and therefore, the formation of pigments which are not sufficient in light resistance and have heretofore been not usable for that reason in the above-described fields makes it possible to use the pigments in such fields by forming them into such resin-treated pigments of the present invention. As a consequence, the use of resin-treated pigments according to the present invention can expand the expression range of colors in products or can provide products with improved durability to result in energy saving, and therefore, the resin-treated pigments according to the present invention are expected to find utility in a wide variety of fields.

The invention claimed is:

1. A pigment dispersion for use as a colorant for an oil-based product, the pigment dispersion comprising:
   a dispersion medium, which comprises at least one medium selected from the group consisting of monomers, organic solvents, thermoplastic resins, thermosetting resins, and UV/ER-curable resins; and
   a resin-treated pigment dispersed in the dispersion medium,
   wherein a resin-treated pigment comprises:
   a pigment; and
   a polymer of an unsaturated bond-containing monomer, wherein the polymer is an acrylic A-B block copolymer, which is formed of a polymer block A, which is formed of an A chain, and a polymer block B formed of a B chain that comprises an addition-polymerizable monomer having a UV-absorbing group in an amount from 5 to 70 mass % relative to a total amount of monomers constituting the polymer, wherein the UV-absorbing group is a UV-absorbing benzotriazole group, a UV-absorbing triazine group, or a UV-absorbing benzophenone group, the acrylic A-B block copolymer contains in its structure, a plenty of aromatic rings provided by the UV-absorbing group, and the aromatic rings are concentrated in the B chain of the acrylic A-B block copolymer, the polymer block A formed of the A chain in the A-B block copolymer is an acrylic polymer that is miscible with the dispersion medium, and the polymer block B formed of the B chain in the A-B block copolymer is an acrylic polymer comprising the addition-polymerizable monomer having the UV-absorbing group, and the polymer block B includes 70 mass % or more of a total mass of the addition-polymerizable monomer included in the A-B block copolymer, and a weight ratio of the pigment to the polymer (pigment:polymer) is from 50 to 95 of the pigment to from 50 to 5 of the polymer, wherein the pigment is encapsulated with the acrylic A-B block copolymer.

2. The pigment dispersion according to claim 1, wherein any one of constituent monomers of the polymer block A of the A chain is at least one methacrylate monomer selected from the group consisting of methyl methacrylate, butyl methacrylate, and 2-ethylhexyl methacrylate.

3. The pigment dispersion according to claim 1, wherein the addition-polymerizable monomer having the UV-absorbing group is a monomer having a methacrylate structure to which the addition-polymerizable group is bonded directly or via a functional group.

4. The pigment dispersion according to claim 1,
wherein the addition-polymerizable monomer having the UV-absorbing group is:
a monomer having the UV-absorbing benzotriazole group selected from monomers obtained by reacting 2-(2'-hydroxy-3'-vinylphenyl)-2H-benzotriazole, 2-(2'-hydroxy-5'-(meth)acryloxyethylphenyl)-2H-benzotriazole, or 2-(2,4-dihydroxyphenyl)-2H-benzotriazole, with glycidyl(meth)acrylate; or
a monomer having the UV-absorbing triazine group selected from the group consisting of a monomer obtained by reacting 2-(2,4-dihydroxyphenyl)-4,6-bis (2,4-dimethylphenyl)-1,3,5-triazine with glycidyl methacrylate, and a monomer obtained by reacting 2-[4-[(2-hydroxy-3-docecylpropyl)oxy]-2-hydroxyphenyl-4,6-bis(2,4-dimethylphenyl)-1,3,5-triazine with (meth)acryloxyethyl isocyanate.

5. The pigment dispersion according to claim 1, wherein the UV-absorbing group in the addition-polymerizable monomer has a benzotriazole structure represented by a following formula, wherein the addition-polymerizable group is bonded at a position of R':

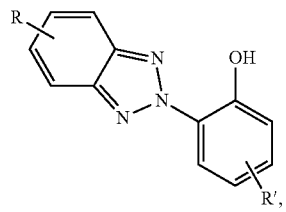

wherein in the above formula, R is a group selected from the group consisting of hydrogen, halogen, an alkyl group, an alkenyl group, an allyl group, an alkoxy group, an ester group, and an oxycarbonyl group.

6. The pigment dispersion according to claim 1, wherein the pigment is encapsulated in the polymer block B of the polymer in the pigment dispersion.

7. The pigment dispersion according to claim 1,
wherein the polymer block A of the A chain has a number average molecular weight (Mn) from 1,000 to 20,000, and as a molecular weight distribution, a ratio of a weight average molecular weight relative to a number average molecular weight (Mw/Mn) of 1.6 or smaller, and
the polymer block B of the B chain has a number average molecular weight (Mn) of lower than 10,000.

8. The pigment dispersion according to claim 1,
wherein the A-B block copolymer comprises methacrylate monomers as all constituent monomer units thereof.

9. A production process for obtaining the pigment dispersion according to claim 1, wherein the production process comprises:
synthesizing the A-B block copolymer by a living radical polymerization process in the presence of at least an organic iodine compound as an initiator compound, and
encapsulating the pigment in the presence of the resulting A-B block copolymer by depositing the A-B block copolymer on a surface of a particle of the pigment so as to treat the pigment with the resulting A-B block copolymer.

10. The production process according to claim 9, wherein the synthesis by the living radical polymerization process uses, as a catalyst, at least one compound selected from the group consisting of phosphorus halides, phosphite compounds, phosphinate compounds, imide compounds, hydantoin compounds, barbituric acids, cyanuric acids, phenolic compounds, iodoxyphenyl compounds, vitamins, diphenylmethane compounds, cyclopentadienes, and acetoacetyl compounds.

* * * * *